US009323552B1

(12) United States Patent
Adogla et al.

(10) Patent No.: US 9,323,552 B1
(45) Date of Patent: Apr. 26, 2016

(54) SECURE VIRTUAL MACHINE MEMORY ALLOCATION MANAGEMENT VIA DEDICATED MEMORY POOLS

(71) Applicant: Amazon Technologies, Inc., Reno, NV (US)

(72) Inventors: Eden Grail Adogla, Seattle, WA (US); Philip John Nesser, II, Bonney Lake, WA (US); Steven Michael Noonan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 276 days.

(21) Appl. No.: 13/830,117

(22) Filed: Mar. 14, 2013

(51) Int. Cl.
*G06F 9/455* (2006.01)
*G06F 15/173* (2006.01)
*G06F 13/00* (2006.01)
*G06F 9/50* (2006.01)

(52) U.S. Cl.
CPC .......... *G06F 9/45533* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 5,964,874 A | 10/1999 | Gross et al. | |
| 5,968,170 A | 10/1999 | Gross et al. | |
| 6,985,976 B1 | 1/2006 | Zandonadi et al. | |
| 7,275,139 B1 | 9/2007 | Tormasov et al. | |
| 7,801,128 B2 | 9/2010 | Hoole et al. | |
| 7,950,022 B1 | 5/2011 | Gould et al. | |
| 8,190,682 B2 | 5/2012 | Paterson-Jones et al. | |
| 8,261,320 B1 | 9/2012 | Serenyi et al. | |
| 8,291,176 B2 | 10/2012 | Hilland et al. | |
| 8,489,898 B2 | 7/2013 | Wong | |
| 8,904,008 B2 * | 12/2014 | Calder et al. | 709/226 |
| 2004/0215619 A1 | 10/2004 | Rabold | |
| 2004/0215911 A1 | 10/2004 | Ouren et al. | |
| 2005/0235123 A1 | 10/2005 | Zimmer et al. | |
| 2005/0256997 A1 | 11/2005 | Koren et al. | |
| 2006/0059318 A1 | 3/2006 | Rao | |
| 2008/0127182 A1 | 5/2008 | Newport et al. | |
| 2008/0168112 A1 | 7/2008 | Lyons et al. | |
| 2009/0006801 A1 | 1/2009 | Shultz et al. | |
| 2009/0113422 A1 | 4/2009 | Kani | |
| 2009/0222915 A1 | 9/2009 | Challener et al. | |
| 2012/0023319 A1 | 1/2012 | Chin et al. | |
| 2012/0265976 A1 | 10/2012 | Spiers et al. | |
| 2013/0275969 A1 * | 10/2013 | Dimitrov | 718/1 |

(Continued)

OTHER PUBLICATIONS

"Amazon Elastic Compute Cloud," Wikipedia, visited Feb. 14, 2013, 10 pages.

(Continued)

*Primary Examiner* — Meng An
*Assistant Examiner* — Bing Zhao
(74) *Attorney, Agent, or Firm* — Klarquist Sparkman, LLP

(57) ABSTRACT

Embodiments are disclosed for recycling memory from a memory pool dedicated to a virtual machine instance. For example, memory sub-pools can be pre-allocated to respective virtual machine instances. Memory scrubbing can be ordinarily performed to avoid data leakage between different customers. However, scrubbing can be inhibited when a given virtual machine reclaims memory previously released to the dedicated pool because the memory remains dedicated to the instance. Further features, such as partition and merge of sub-pools can be supported. Control of the features can be accomplished via API calls as part of a web service.

20 Claims, 13 Drawing Sheets

(56) References Cited

U.S. PATENT DOCUMENTS

2014/0047193 A1 2/2014 Gross et al.
2014/0229766 A1 8/2014 Campbell

OTHER PUBLICATIONS

"Cloud Computing on AWS," aws.amazon.com, visited Feb. 14, 2013, 6 pages.

"Xen," Wikipedia, visited Feb. 14, 2013, 8 pages.

U.S. Appl. No. 13/829,936, filed Mar. 14, 2013, Adogla et al.

U.S. Appl. No. 13/830,034, filed Mar. 14, 2013, Adogla et al.

Uniquely Identifying Virtual Machines in vSphere and vCloud Part 1: Overview, Article. VMware, Feb. 8, 2012, retrieved from: logs.vmware.com/vsphere/2012/uniquely-identifying-virtual-machines-in-vsphere-and-vcloud-part-1-overview.html.

* cited by examiner

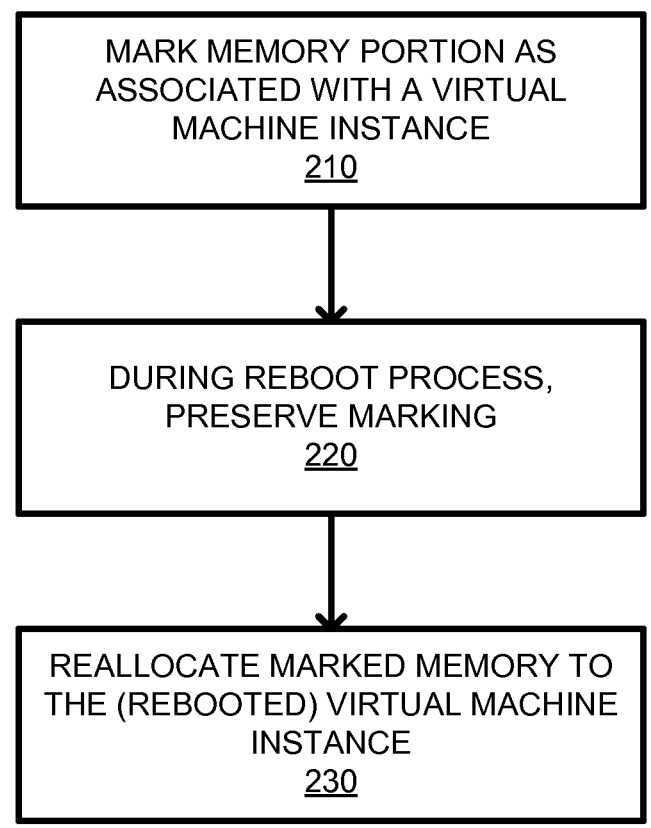

FIG. 4
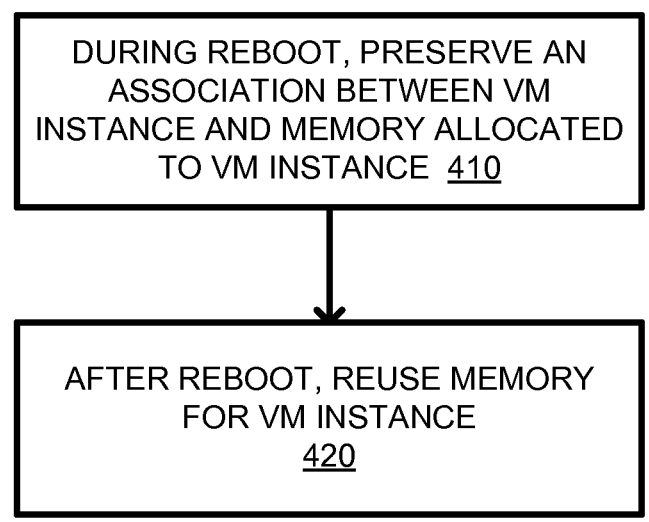

900

US 9,323,552 B1

SECURE VIRTUAL MACHINE MEMORY ALLOCATION MANAGEMENT VIA DEDICATED MEMORY POOLS

BACKGROUND

In shared virtualized hosting environments, security concerns dictate that the contents of memory be wiped before allocation to prevent leaking information to another user. For example, when memory is allocated to a virtual machine instance without first scrubbing the memory, data from previous memory allocations may remain available for inspection by another user. It is thus possible for a user to collect information left behind by the virtual machines of other users. Such information leakage can be problematic because virtual machine users typically expect their information to remain private.

A simple solution is to simply scrub memory after every memory deallocation, before every memory allocation, or both. However, as virtual machine instances increase in size, considerable resources can be expended on memory scrubbing.

BRIEF DESCRIPTION OF THE DRAWINGS

FIG. 2 is a flowchart of an example method of implementing secure virtual machine reboot via memory allocation recycling.

FIG. 4 is a flowchart of an example alternative method of implementing secure virtual machine reboot via memory allocation recycling.

DETAILED DESCRIPTION

Example 1

Example Overview

The technologies described herein can be used for secure hosting of virtual machine instances executed by multiple customers in a hosting environment. Adoption of the technologies can provide improved performance due to reduction in resources spent scrubbing memory.

The technologies can be helpful for those wishing to provide virtual machine hosting services to multiple customers while maintaining data confidentiality. Unwanted information leaking between users can be avoided. Beneficiaries include virtual machine hosting service providers who wish to securely provide access to virtual machine instances by multiple customers. Customers can also benefit from the technologies because they can experience performance improvements.

Example 2

Example Overview of Secure Virtual Machine Reboot Via Memory Allocation Recycling Whenever a virtual machine is rebooted, the memory allocated to the virtual machine is typically deallocated as part of the reboot process. However, immediately thereafter, memory is needed for allocation to the virtual machine for use after reboot. Ordinarily, memory is typically scrubbed before reallocation, and scrubbing large memory allocations can consume considerable resources. As described herein, when a virtual machine reboots, the memory can be recycled (e.g., provided back to the virtual machine while avoiding scrubbing) to avoid unnecessarily expending resources on scrubbing while still maintaining customer expectations regarding security.

Example 3

Example Secure Virtual Machine Reboot Via Memory Allocation Recycling

Figure 1A:
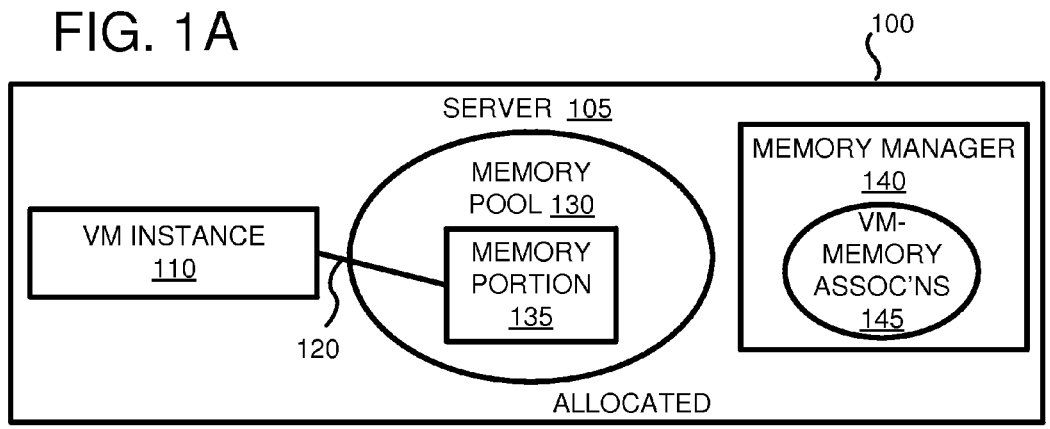
FIGS. 1A-C are an illustrative overview of an example implementation of secure virtual machine reboot via memory allocation recycling.
Figure 1B:
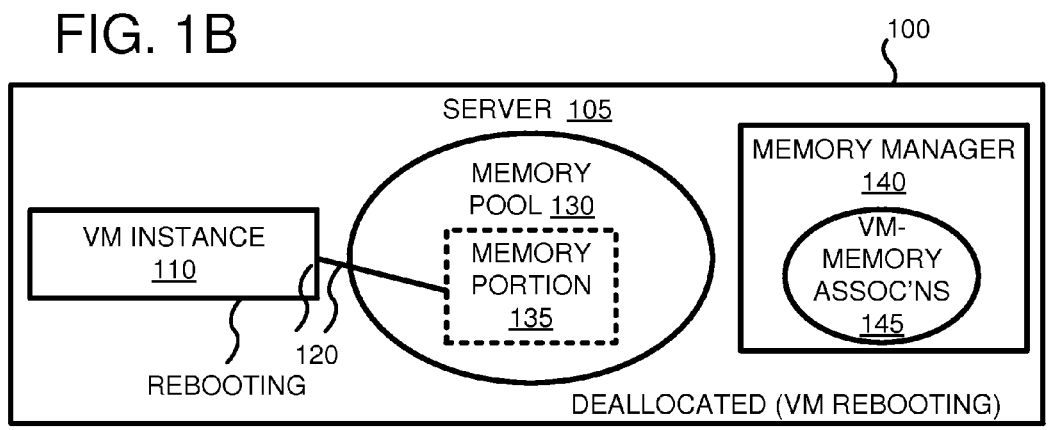
Figure 1C:
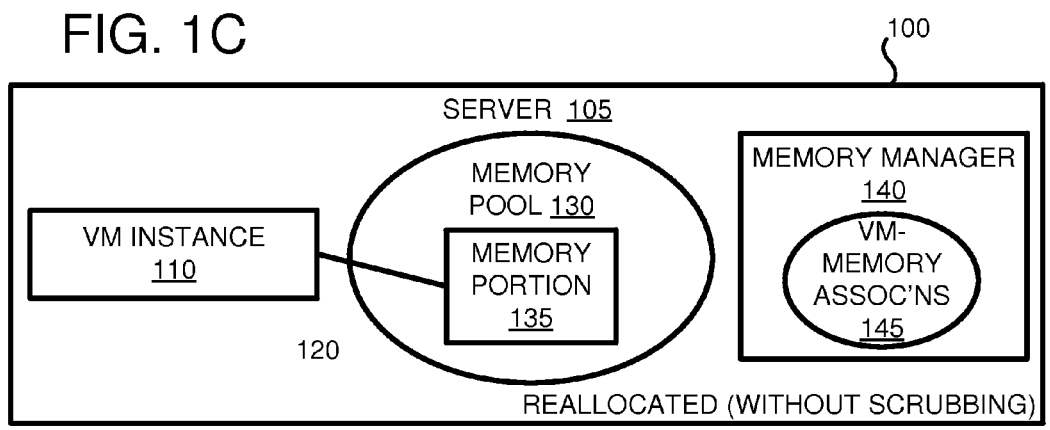

FIGS. 1A-C are an illustrative overview of an example implementation of secure virtual machine reboot via memory allocation recycling. The overview shows a sequence of events in FIG. 1A (memory allocated to virtual machine), FIG. 1B (the memory is deallocated during reboot), and FIG. 1C (the memory is reallocated to the same virtual machine without scrubbing).

In FIGS. 1A-C, a server 105 hosts a virtual machine (VM) instance 110. A memory manager 140 maintains VM-memory associations 145 that indicate the memory portions that have been allocated to a virtual machine instance.

As shown in FIG. 1A, a memory portion 135 out of a memory pool 130 has been allocated to the virtual machine instance 110. An association 120 ties the virtual machine instance 110 to the memory portion 135. For example, the memory portion 135 can be marked as to be preserved for the virtual machine instance 110 after reboot.

Subsequently, in FIG. 1B, the virtual machine instance 110 is rebooted. As part of the reboot process, the memory portion 135 is deallocated. However, the association 120 is maintained during reboot. The memory portion 135 is reserved for when the virtual machine instance 110 comes back up because it is known that the virtual machine instance 110 is rebooting.

As shown in FIG. 1C, based on the association 120, the same memory portion 135 is reallocated to the same virtual machine instance. In practice, the association 120 need not be maintained after reallocation, but can be.

Scrubbing of the memory portion 135 can be inhibited as described herein. The insight leveraged here is that there is no need to scrub memory that will later be returned to a virtual machine instance right after the virtual machine instance relinquishes it temporarily as it reboots. In short, if a virtual machine will be coming back online soon, do not bother erasing the memory it had.

In practice, the systems shown herein, such as system 100 can vary in complexity, with different functionality, components of differing complexity, and the like. For example, in practice, a server will typically host a plurality of virtual machine instances and have a memory pool with various memory portions allocated to the virtual machine instances. Additional features relating to security and redundancy can also be included.

The system 100 and any of the other systems described herein can be implemented in conjunction with any of the hardware components described herein, such as the computing systems described below (e.g., processing units, memory, and the like). In any of the examples herein, the inputs, outputs, associations, and policies can be stored in one or more computer-readable storage media or computer-readable storage devices. The technologies described herein can be generic to the specifics of operating systems or hardware and can be applied in any variety of environments to take advantage of the described features.

Example 4

Example Method of Secure Virtual Machine Reboot Via Memory Allocation Recycling

Figure 3:
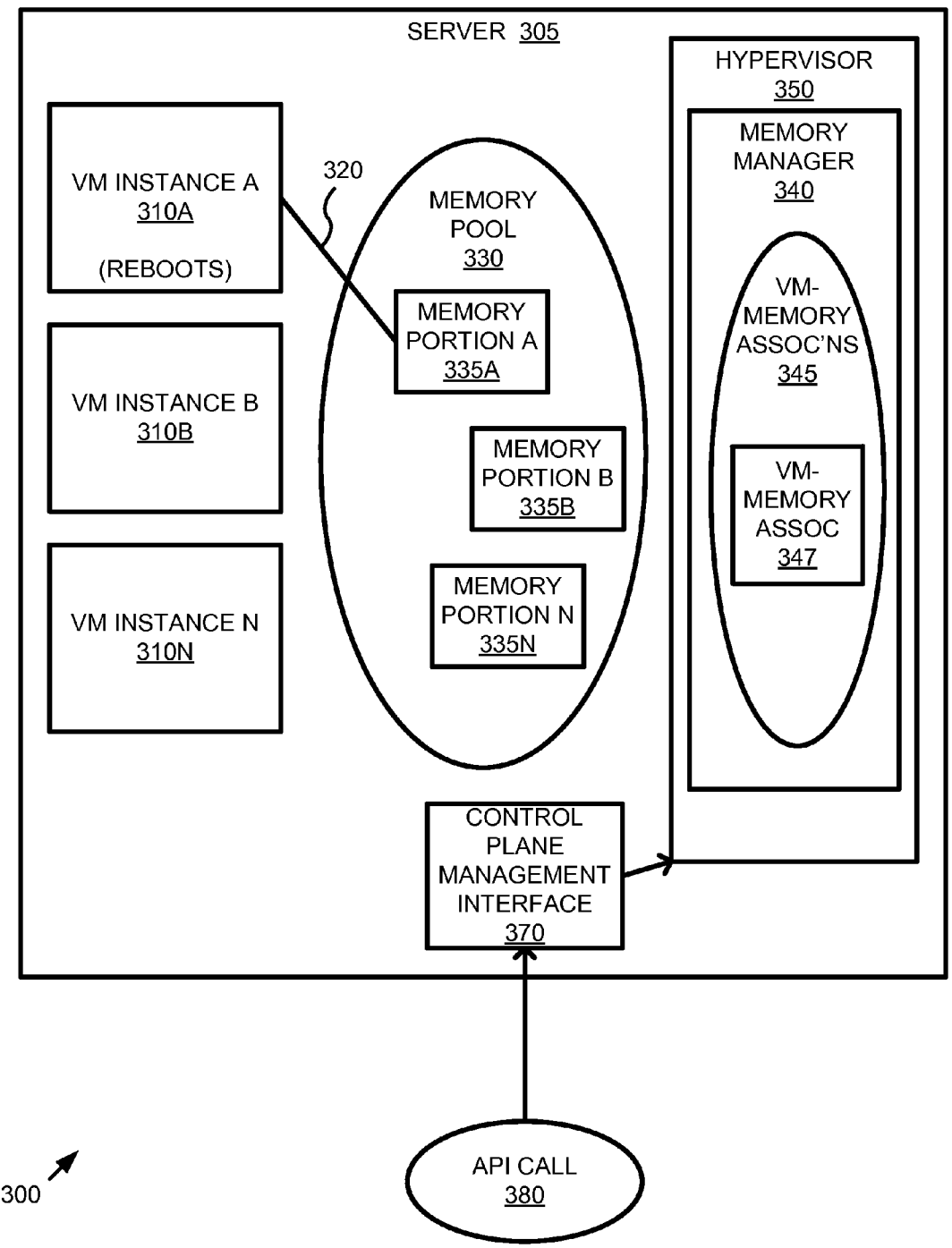
FIG. 3 is a block diagram of an example system implementing secure virtual machine reboot via memory allocation recycling.

FIG. 2 is a flowchart of an example method 200 of secure virtual machine reboot via memory allocation recycling and can be implemented, for example, in a system such as that shown in FIG. 1 or 3.

At 210, memory (e.g., a memory portion of a memory pool) that is currently allocated to a virtual machine instance is marked as associated with (e.g., allocated to) the virtual machine instance.

At 220, during a reboot process for the virtual machine instance, the marking is preserved. Ordinarily, as part of the reboot process (e.g., deprovisioning), the memory portion would normally be unmarked (e.g., deallocated) and placed into the pool of free memory. Instead, as described herein, the marked memory is held back from being put back in the free pool. Thus, instead of removing the marking, as would ordinarily be done (e.g., association between the memory and the virtual machine is removed), the marking is preserved.

At 230, the marked memory is reallocated to the virtual machine instance (e.g., the rebooted virtual machine instance). In practice, allocation can take place before, during, or after the reboot. After the reboot process is complete, the memory remains allocated to the virtual machine instance. The reallocating can be based at least on determining that the marked memory is marked as previously allocated to the same virtual machine instance.

In practice, after reboot, the virtual machine instance may require only a subset of the memory portion that was allocated before reboot. For example, the virtual machine instance may have taken advantage of a memory ballooning feature during execution to increase the amount of memory beyond that initially allocated (e.g., the amount of memory indicated as to be allocated in the virtual machine template or image).

Although scrubbing of the memory may ordinarily take place because the memory was deallocated and reallocated, scrubbing can be inhibited for the marked memory (e.g., or the subset of the memory portion as described above) after the marked memory is deallocated from the virtual machine instance during the reboot process. By deallocation, the virtual machine instance temporarily relinquishes the marked memory.

Subsequently, when the virtual machine instance is terminated (e.g., not rebooted, but terminated permanently), scrubbing can be performed on the memory (e.g., or the subset) responsive to termination. The memory no longer needs to be marked, and the association between the memory portion and the virtual machine instance no longer needs to be preserved.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be executed at least in part by a computing system.

Example 5

Example System Implementing Secure Virtual Machine Reboot Via Memory Allocation Recycling FIG. 3 is a block diagram of an example system 300 implementing secure virtual machine reboot via memory allocation recycling.

In the example, a plurality of virtual machine instances 310A-N are managed by a hypervisor 350, which includes a memory manager 340 that maintains associations 345 between virtual machine instances (e.g., 310A-N) and memory portions (e.g., 335A-N) in the memory pool 330. An example association 347 can relate a particular virtual machine instance (e.g., 310A) and one or more particular memory portions (e.g., 335A).

In the example, the system 300 also supports application programming interface (API) calls 380. Such calls can be received by a control plane management interface 370 and sent to the memory manager 340 to configure how the memory manager applies the technologies described herein. For example, a memory policy can be specified to determine how or whether the memory manager 340 applies various memory recycling technologies to the virtual machine instances 310A-N. As described herein, the control plane management interface 370 can reside on a different machine than the server 305 hosting the virtual machine instances 310A-N.

In the example, an association 320 between a rebooting virtual machine instance 310A and a memory portion 335A is preserved during the reboot process. The memory portion 335A can then be reallocated to the instance 310A without scrubbing as described herein. In any of the examples herein, one or more memory portions 335A can be involved.

Example 6

Example Alternative Method of Secure Virtual Machine Reboot Via Memory Allocation Recycling FIG. 4 is a flowchart of an example alternative method 400 of implementing secure virtual machine reboot via memory allocation recycling and can be implemented, for example, in a system such as that shown in FIG. 1 or 3.

In the example, a reboot process is initiated for a virtual machine instance. At 410, after the reboot process is initiated, an association between the virtual machine instance and memory that was allocated to the virtual machine instance before the reboot process is preserved.

At 420, after the reboot process, at least a subset of the memory that was allocated to the virtual machine instance before the reboot process was initiated is reused for the virtual machine instance. For example, if the memory is deallocated, the memory (e.g., or a portion of it) can be reallocated to the instance.

The reusing can be based at least on the association between the virtual machine instance and the memory that was allocated to the virtual machine instance. As described herein, scrubbing of the reused memory can be inhibited.

As described herein, an indication to enable memory reuse after reboot (e.g., without scrubbing) can be received via an API call. The reusing can then be performed responsive to such an indication. As described herein, such API calls can operate at the virtual machine instance level or other levels of granularity.

Example 7

Example Reboot

In any of the examples herein, a virtual machine instance may reboot for a variety of reasons. For example, an operating system executing on a virtual machine instance may reboot for any of variety of reasons internal to the operating system. Alternatively, an external reason (e.g., API call or the like) can reboot the virtual machine instance. As part of the reboot process, the guest operating system can shut down, the virtual machine instance is typically deprovisioned (e.g., memory is deallocated, and the like), relationships to the host (e.g., Dom0 or other initial domain) can be severed, and then the relationships can be recreated. Memory can be reallocated as described herein.

Example 8

Example Reboot with Less Memory

In any of the examples herein, a virtual machine instance may be allocated less memory after reboot than was used before reboot. For example, before the reboot, a memory allocation of the virtual machine instance may have been ballooned. When rebooting, the amount of memory specified in the template or image for the virtual machine instance may be a lesser amount.

If so, memory reuse may use less memory than what was used before the reboot (e.g., because the extra memory is not needed). In such case, the left over memory can be scrubbed and returned to the shared memory pool. Or, the memory can continue to be reserved in anticipation of an upcoming memory ballooning request, and the memory can be used to fulfill the ballooning request (e.g., without scrubbing).

Example 9

Example Enabling and Disabling of Memory Reuse after Reboot

In any of the examples herein, a feature can allow a virtual machine instance to enable or disable memory reuse after reboot. For example, an indication to disable memory reuse after reboot can be received. Responsive to the indication, memory is not reused (e.g., unless it is first scrubbed) after a reboot of the virtual machine instance.

Further, it can be explicitly specified that the virtual machine be forced to different memory after a reboot (e.g., regardless of whether the memory is scrubbed or not). Such a feature can be helpful when attempting to determine whether a hardware failure is causing the virtual machine to repeatedly land on defective memory.

Such features can be invoked via API calls (e.g., received by a control plane management interface configured to accept such API calls). For example, an API call can specify the virtual machine instance and which features are enabled or disabled. For example, a particular API call can enable memory reuse after reboot without scrubbing (e.g., inhibiting memory scrubbing when allocating a memory portion to a same virtual machine instance after reboot of the virtual machine instance). In practice, customers may prefer a particular default (e.g., no reuse), which can be supported (e.g., customers opt-in to avail themselves of reuse).

Example 10

Example Customers

In any of the examples herein, a hosting environment can support multiple customers. Such a customer may be identified by a customer identifier but can have a plurality of users who avail themselves of the hosting services. Although a customer may be treated as a logical unit for some purposes, different users within a single customer may have different configuration preferences or requirements. Further, a customer or user may be performing processing for more than one internal user. Therefore, control over features can be supported at a finer level of granularity than the customer identifier level. For example, memory use trust groups, virtual machine instance identifiers, or other mechanisms can be supported as described herein.

Example 11

Example Scrubbing

In any of the examples herein, memory scrubbing can take the form of removing the contents of memory. In practice, such scrubbing can take any of a variety of approaches, such as erasing memory or overwriting memory with a pattern (e.g., zeros, ones, or some other pattern) or random data to avoid the possibility that data leftover in the memory from previous processing (e.g., by another virtual machine instance) can be read.

In practice, allocation of memory to a virtual machine instance can be prevented until scrubbing is completed. Implementations can adopt a scrub-after-deallocation approach, a scrub-before-allocation approach, or some combination of the two. Instead of immediate scrubbing, scrubbing can be scheduled for performance at a later time, during which time, allocation of the memory is avoided.

However, as described herein, allocation (e.g., recycling) of memory without scrubbing or with only partial scrubbing can be implemented as described herein while addressing security concerns.

Example 12

Example Virtual Machine Instances

In any of the examples herein, a hosting environment can support execution of multiple virtual machine instances. Such virtual machine instances can support any of a variety of operating systems, virtual hardware configurations, and the like. In practice, virtual machine instances can be divided into different respective logical domains. Thus, the instances are sometimes themselves called "domains." Such domains can be considered different entities for purposes of security, isolation, and the like.

The hosting environment can provide the virtual machine instance with requested resources. The hosting environment can be operated by a service provider providing services to one of a plurality of customers availing themselves of the services in a cloud computing scenario. Thus, the virtual machine instances are also sometimes called "guests." Such guests can start, execute, reboot, and terminate on the hosting server.

Example 13

Example Memory Manager

In any of the examples herein, a memory manager can provide services related to memory allocation and deallocation for virtual machine instances. In practice, the memory manager manages the allocation of memory in a memory pool that is shared among the virtual machine instances. Such a memory manager can be incorporated into a hypervisor or other manager of virtual machine instances. Thus, any of the actions described or shown as performed by the memory manager can be performed by a hypervisor.

Management of the memory pool shared among virtual machine instances can be done independently or separately from memory management within a virtual machine instance. How the virtual machine instance manages its own memory internally need not be connected to external memory management (e.g., of the memory pool shared among the virtual machine instances) as described herein.

The memory manager can be configured to ordinarily scrub memory before allocating it to a virtual machine instance. However, as described herein, the memory manager can be further configured to inhibit memory scrubbing when reallocating a memory portion to a same virtual machine instance after reboot of the virtual machine instance.

The memory manager can track allocations and leverage such tracking mechanisms to support the features described herein. For example, an allocation can be specially marked as reserved for returning to a virtual machine instance after reboot as described herein. Alternatively, a mechanism separate from the allocation mechanism can be employed as desired.

Example 14

Example Allocation and Deallocation of Memory

In any of the examples herein, allocation of memory from the memory pool to a virtual machine instance and deallocation from a virtual machine instance to the memory pool can be supported. Allocations can be chosen from available memory, and deallocations can be returned to the pool for subsequent use by the same instance or other instances (e.g., subject to scrubbing as described herein). While allocated to a particular virtual machine instance, memory is typically unavailable to other virtual machine instances to enforce isolation. Although some of the examples show an allocation as a single portion, in practice, one or more portions of memory can be allocated to a virtual machine instance. Because memory addresses from the virtual machine's perspective can be mapped to the memory allocated from the pool, whether or not such portions are contiguous can be transparent to the internal execution of the virtual machine.

Such memory allocation can occur in a number of scenarios. For example, a virtual machine instance that is being created for hosting is sometimes called an "incoming guest." Such an incoming guest is typically associated with a specified amount of memory (e.g., according to a template configuration or image). As part of the creation process, the specified amount of memory is allocated for the virtual machine instance before it is launched. Subsequently, when the instance terminates, the memory is deallocated. Rebooting can also result in deallocation as described herein; subsequently, the resurrected instance is then allocated memory as described herein.

Memory ballooning as described herein can also result in memory allocation after a virtual machine instance is created.

Allocating memory that has been previously deallocated is sometimes called "recycling" or "reusing" memory. Such recycling or reusing can be done while avoiding scrubbing (e.g., without scrubbing or only partial scrubbing) as described herein.

Example 15

Example Memory Pool

In any of the examples herein, a memory pool can be partially or fully shared between virtual machine instances (e.g., from multiple, different customers) executing in a hosting environment. Such a memory pool may comprise memory pages, portions, or the like. The memory pool described herein can comprise volatile memory such as RAM or nonvolatile storage such as magnetic or optical storage. Other technologies (e.g., solid state disks or the like) can also be supported.

In practice, the memory can be organized as a heap or other arrangement that is managed to track allocations, deallocations, and available remaining memory. Associations between virtual machine instances and memory portions within the memory pool can be stored in a variety of ways. Portions or pages of the pool can be marked as allocated to a particular virtual machine instance, a separate data structure can track allocations, or the like.

Example 16

Example Marking

In any of the examples herein, one or more portions of a memory pool can be marked as associated with a virtual machine instance for purposes of reserving the memory for reuse after reboot. Such marking can be achieved by marking the memory portion (e.g., reserved memory pages), using a special allocation status (e.g., reserved for reboot), storing a separate association, or the like. Such marking, whether by association or other mechanism can be preserved (e.g., by the memory manager) during reboot of the virtual machine instance.

As described herein, an association between the rebooting virtual machine instance and the one or more memory portions allocated to the virtual machine instance can be stored (e.g., by a memory manager, in a memory pool, or the like).

Example 17

Example Detection of Reboot

In any of the examples herein, the memory manager, hypervisor, or other mechanism can be configured to detect when a virtual machine instance is about to reboot. For example, differentiation between termination (without reboot) and reboot can be supported. The memory recycling feature described herein can be implemented for those occasions where a reboot is about to take place or is initiated or requested.

In practice, reboot requests can be monitored to determine when a reboot process for a virtual machine instance is initiated.

Example 18

Example Ballooning

In any of the examples herein, the memory manager can support memory ballooning. For example, when a virtual machine instance is instantiated, a certain amount of memory may be requested (e.g., as part of a template or image).

Subsequently, during execution, ballooning functionality may be used by or for the virtual machine instance to request additional memory beyond that initially allocated. The memory manager can process and grant such a request by allocating additional memory from the memory pool as described herein. Such a request can be external to the virtual machine instance; however, functionality can be implemented by which a virtual machine instance requests additional memory via ballooning.

Example 19

Example Control Plane Management Interface

In any of the examples herein, a control plane management interface can be configured to accept API calls and communicate information to one or more hypervisors responsible for managing execution of virtual machine instances, thereby providing the technologies described herein as part of a web service. For example, in a scenario where cloud computing is provided as a service, users of the service can configure the technologies by specifying parameters in API calls.

The control plane management interface can take the form of a specialized web server of other management software. Although the control plane management interface is shown in examples as residing on the same server machine as the memory manager and virtual machine instances, it is possible to implement the control plane management interface on a separate server machine that then communicates to the relevant hypervisor, memory manager, or the like.

Example 20

Example Advantages of Secure Virtual Machine Reboot Via Memory Allocation Recycling Scrubbing memory can consume considerable resources, so avoiding scrubbing in reboot scenarios can greatly increase performance, especially for large (e.g., high storage) platform virtual machine instances.

Example 21

Example Overview of Secure Virtual Machine Memory Allocation Management Via Dedicated Memory Pools Memory scrubbing is typically performed on memory after deallocation to prevent information leakage. However, dedicated memory pools can be assigned to virtual machine instances. If a memory allocation request is received for a virtual machine, memory can be provided from the dedicated memory pool. Even if such memory was previously used and deallocated, it can be recycled (e.g., provided back to the virtual machine while avoiding scrubbing) within the dedicated pool. Such an approach avoids unnecessarily expending resources on scrubbing while still maintaining customer expectations regarding security.

Example 22

Figure 5:
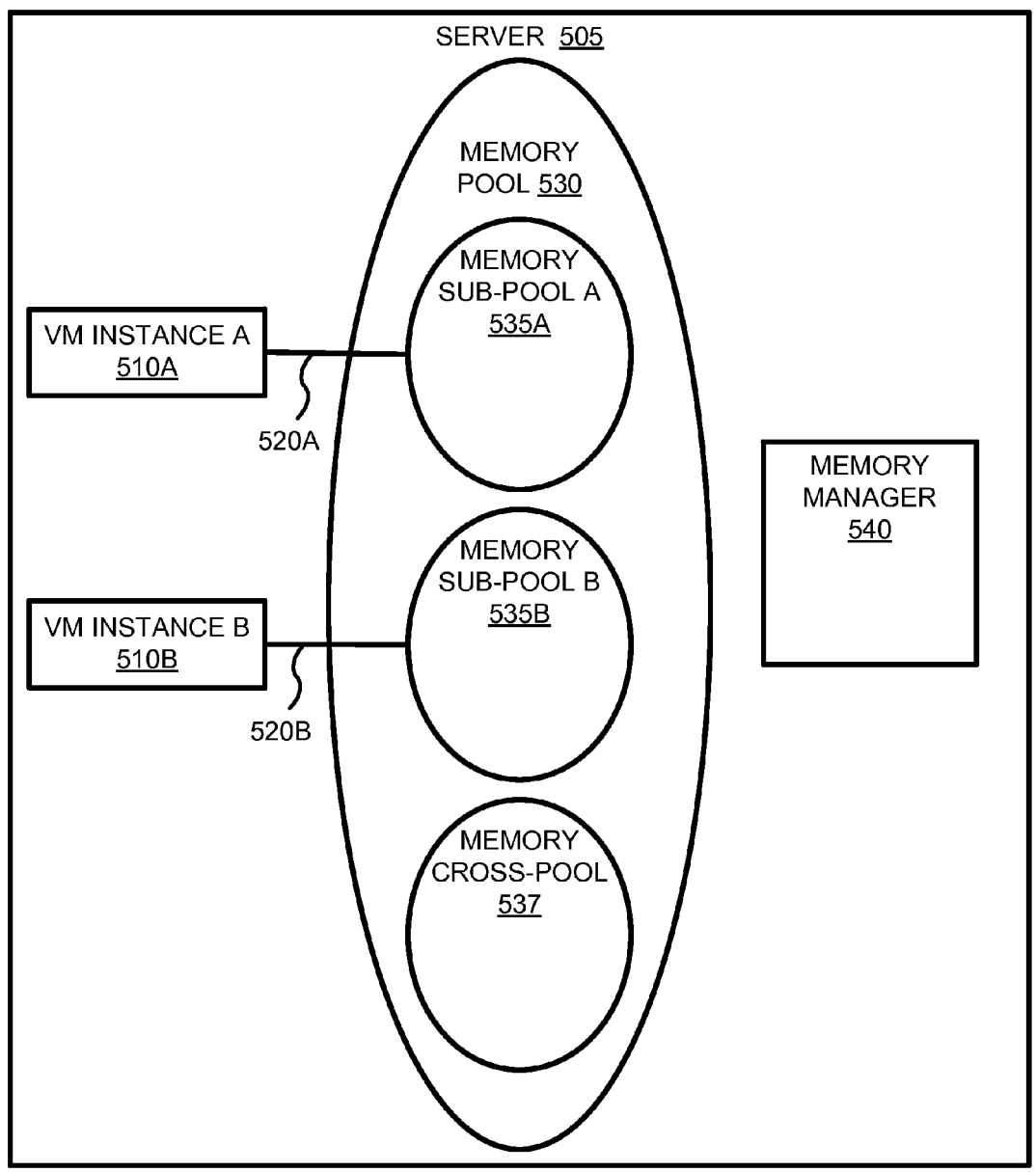
FIG. 5 is a block diagram of an example system implementing secure virtual machine memory allocation management via dedicated memory pools.

Example System Implementing Secure Virtual Machine Memory Allocation Management Via Dedicated Memory Pools FIG. 5 is a block diagram of an example system 500 implementing secure virtual machine memory allocation management via dedicated memory pools.

In the example, a memory manager 540 executing on a server 505 manages a memory pool 530 for allocation to virtual machine instances 510A-B by managing per-VM-instance memory sub-pools 535A-B and memory cross pool 537.

The memory sub-pools 535A-B can be assigned to (e.g., pre-allocated for) the virtual machine instances. For example, if an expected or configured number of virtual machine instances is known, the memory pool 530 can be divided among the instances. Associations 520A-B can be maintained between the virtual machine instances 510A-B and their respective, dedicated memory sub-pools 535A-B.

An amount of memory can be reserved for the cross-virtual-machine-instance pool 537. Memory in the cross pool 537 is allocable to any of the virtual machine instances. The memory manager 540 can be configured to scrub memory returned to the cross pool 537. In practice, the cross pool 537 need not be explicitly allocated (e.g., the memory can simply reside in the memory pool 530). It is possible that the cross pool 537 becomes of size zero (e.g., no cross-pool memory remains).

When allocating memory to the virtual machine instances 510A-B, the memory manager 540 can use the memory from the respective assigned, dedicated sub-pools 535A-B. Ballooning or other functionality that deviates from expected allocations can be supported from the memory cross-pool 537. Although scrubbing can ordinarily be performed before allocating memory to a virtual machine instance (e.g., before pre-allocation), scrubbing can be inhibited when memory is allocated (e.g., deallocated and reallocated) from a dedicated memory sub-pool to the same virtual machine instance.

Because a virtual machine instance has memory dedicated to it, it is not necessary to scrub between reuse (e.g., until the virtual machine instance terminates or is otherwise going away permanently).

Example 23

Figure 6:
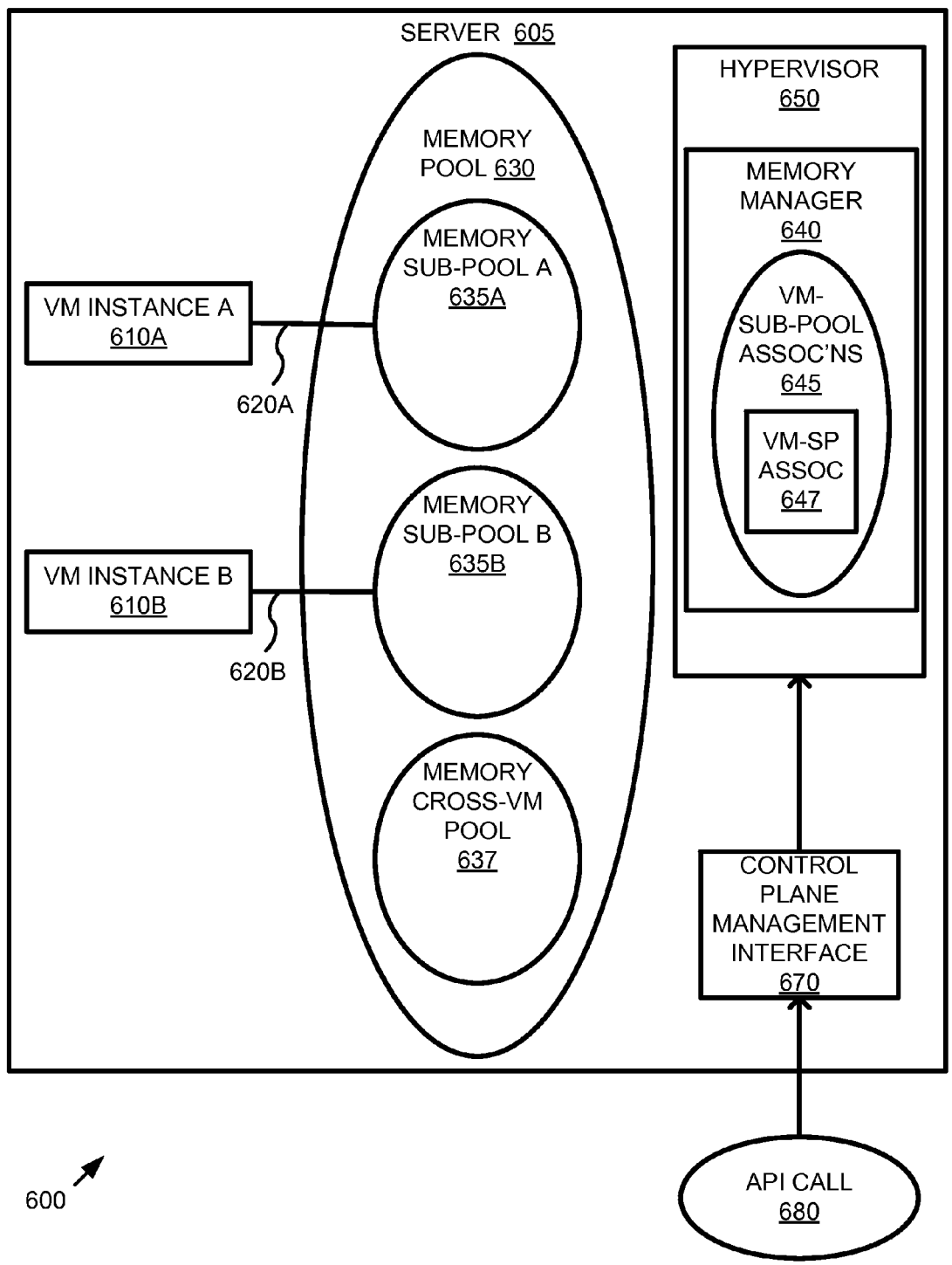
FIG. 6 is a more detailed block diagram of an example system implementing secure virtual machine memory allocation management via dedicated memory pools.

Example System Implementing Secure Virtual Machine Memory Allocation Management Via Dedicated Memory Pools with API Support FIG. 6 is a more detailed block diagram of an example system 600 implementing secure virtual machine memory allocation management via dedicated memory pools with API support. The server 605, virtual machine instances 610A-B, associations 620A-B, memory pool 630, memory sub-pools 635A-B, memory cross-pool 637, and memory manager 640 can perform similarly as shown in FIG. 5. In either arrangement, the dedicated memory sub-pools 635A-B can be isolated from each other (e.g., memory from one of the sub-pools is not moved to another one of the sub-pools without scrubbing).

The memory manager 640 can store information about the sub-pools (e.g., size, location, and the like) and the associations 647 between the virtual machine instances 610A-B and the memory sub-pools 635A-B (e.g., associations 620A and 620B).

The memory manager 640 can be implemented as part of a hypervisor 650 that can receive configuration directives from a control plane management interface 670 that receives API calls 680 as part of a web service provided to customers availing themselves of the virtual machine hosting environment. As described herein, the API calls 680 can be used to configure the behavior of the memory manager 640 (e.g., to enable sub-pool creation for a virtual machine instance as described herein).

Example 24

Figure 7:
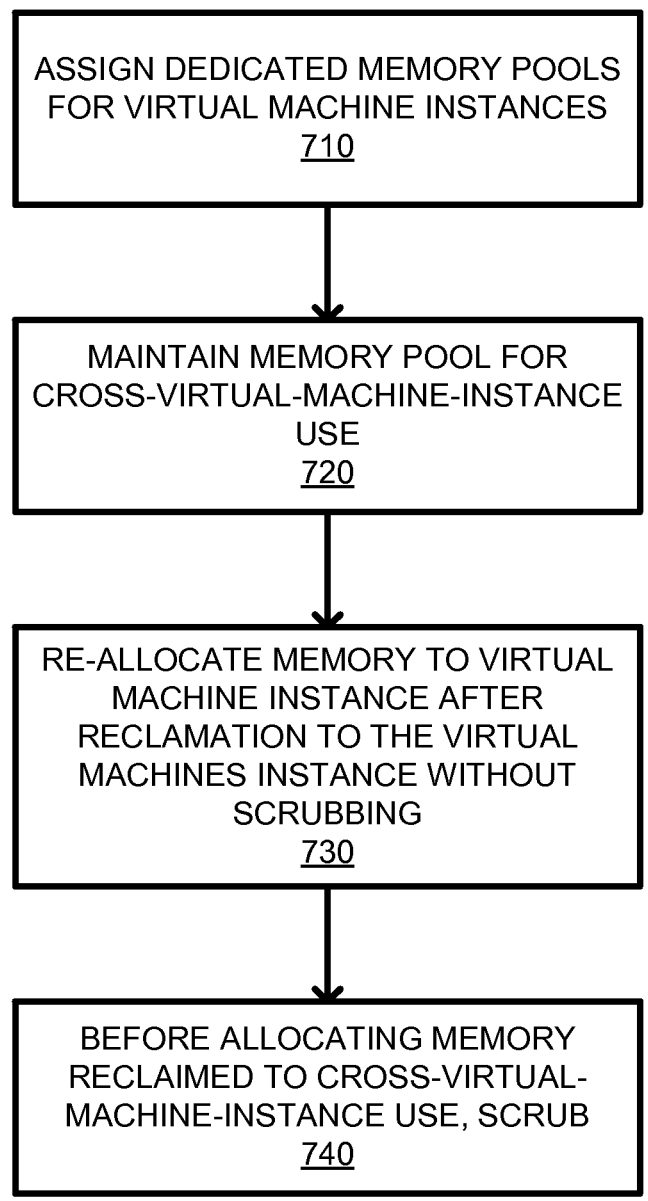
FIG. 7 is a flowchart of an example method of secure virtual machine memory allocation management via dedicated memory pools.

Example Method of Secure Virtual Machine Memory Allocation Management Via Dedicated Memory Pools FIG. 7 is a flowchart of an example method 700 of secure virtual machine memory allocation management via dedicated memory pools and can be implemented, for example, in a system such as that shown in FIG. 5 or 6.

At 710, dedicated memory pools are assigned for respective of the virtual machine instances. For example, as described herein, sub-pools from a memory pool can be assigned to the virtual machine instances.

At 720, a memory pool for cross-virtual-machine-instance use can be maintained.

At 730, after memory is reclaimed from a given virtual machine instance to a dedicated memory pool for the virtual machine instance, it is reallocated to the virtual machine instance (e.g., from the dedicated pool) without scrubbing.

At 740, before allocating memory reclaimed to the memory pool for cross-virtual-machine-instance use, the memory reclaimed to the memory pool for cross-virtual-machine-instance use is scrubbed.

Subsequently, for a virtual machine instance having a dedicated memory pool, upon termination of the virtual machine instance, the dedicated memory pool can be scrubbed.

Example 25

Example Partition and Merge

In any of the examples herein supporting dedicated memory pools, a memory pool can be partitioned, merged, or both.

In a partition scenario, a request to partition a memory pool dedicated to a virtual machine instance can be received. Responsive to the request, the dedicated memory pool can be partitioned into at least two partitions. One of the partitions can remain dedicated to the virtual machine instance to which it was originally dedicated.

In a merge scenario, a request to merge the dedicated memory pool with another dedicated memory pool can be received. Responsive to the request, the memory pools can be merged.

Partition and merge functionality can be controlled via API calls to a control plane management interface as described herein.

Example 26

Example Grow and Shrink Functionality

In any of the examples herein, the memory pools (e.g., the dedicated sub-pools, the cross pool, or the like) can grow (e.g., increase size of the pool) or shrink (e.g., decrease size of the pool) as desired to accommodate requests or particular situations. Memory can thus be shifted from one pool to another. For example, to grow a dedicated pool, memory from the cross pool can be shrunk.

For example, when a virtual machine instance reboots, the dedicated memory pool can be grown to the present size (e.g., immediately before reboot) of the virtual machine instance. Such a scenario can be useful in a variety of scenarios, such as after a virtual machine instance is subjected to ballooning. Thus, memory pool resizing on reboot can be supported.

Example 27

Example Overview of Secure Virtual Machine Memory Allocation Via Memory Usage Trust Groups Memory scrubbing is typically performed on memory after deallocation to prevent information leakage. However, memory usage trust groups can be supported for virtual machine instances. If a memory allocation request is received for a virtual machine, memory can be recycled (e.g., provided while avoiding scrubbing) from a deallocation of another virtual machine in the same trust group. Such an approach avoids unnecessarily expending resources on scrubbing while still maintaining customer expectations regarding security. Memory scrubbing can be canceled if scheduled or already begun.

Example 28

Example Secure Virtual Machine Memory Allocation Via Memory Usage Trust Groups

Figure 8A:
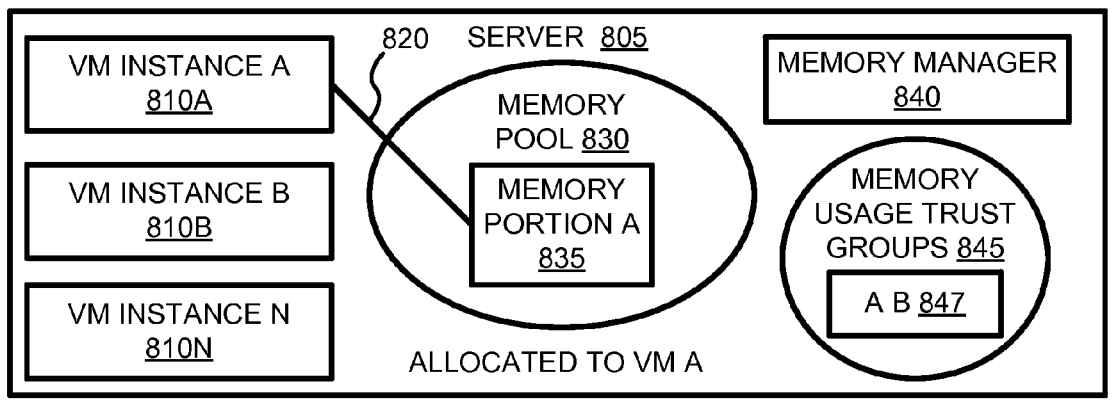
FIGS. 8A-C are an illustrative overview of an example implementation of secure virtual machine memory allocation via memory usage trust groups.
Figure 8B:
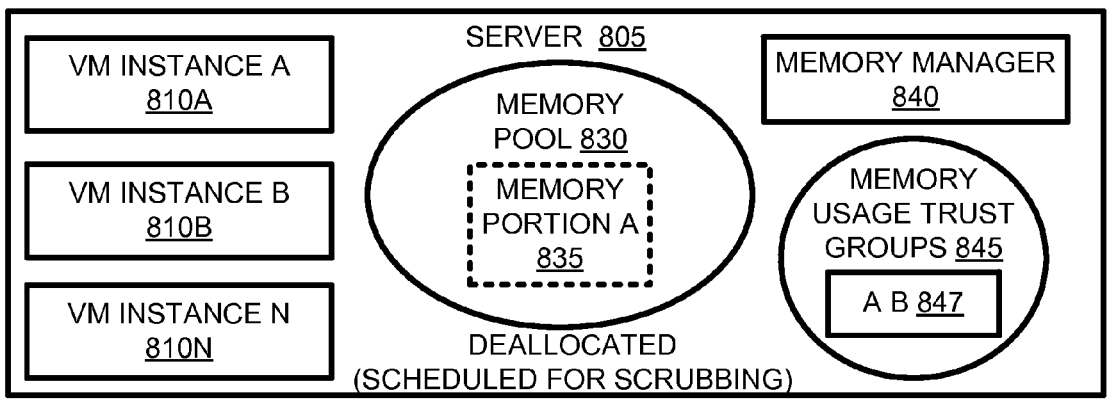
Figure 8C:
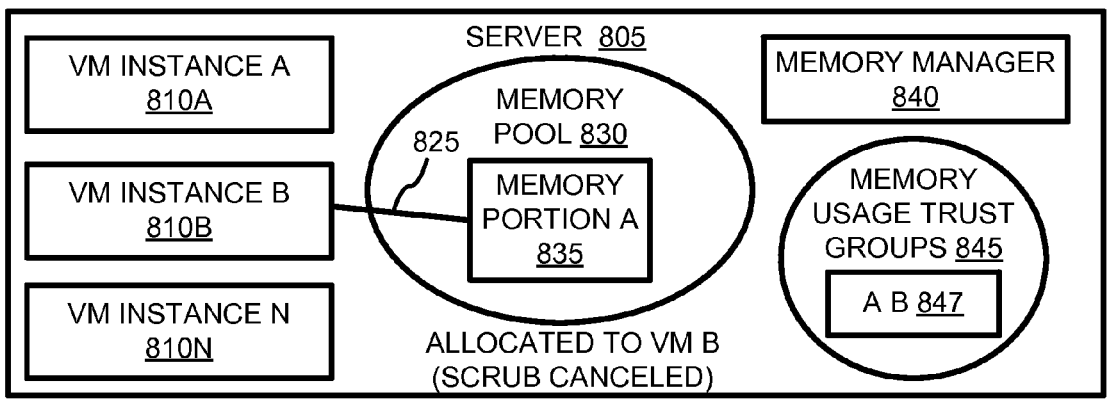

FIGS. 8A-C are an illustrative overview of an example implementation of secure virtual machine memory allocation via memory usage trust groups. The overview shows a sequence of events in FIG. 8A (memory allocated to a first virtual machine), FIG. 8B (the memory is deallocated and scheduled for scrubbing), and FIG. 8C (scrubbing is canceled, and the memory is allocated to another virtual machine in the same memory usage trust group).

In FIGS. 8A-C, a server 805 hosts virtual machine instances 810A-N. A memory manager 840 tracks memory allocations (e.g., allocations 820 and 825) for the virtual machine instances 810A-N. The memory manager 840 also has access to memory usage trust groups 845 (e.g., the trust group 847, which contains VM A and VM B).

As shown in FIG. 8A, a memory portion 835 out of a memory pool 830 has been allocated to the virtual machine instance 810A.

Subsequently, as shown in FIG. 8B, the memory portion 835 is deallocated from the virtual machine instance 810A. Upon deallocation, the memory portion can be scheduled for scrubbing.

However, as shown in FIG. 8C, to fulfill a memory allocation request for virtual machine instance 810B, scrubbing can be canceled, and the memory portion 835 can be reused and allocated to the virtual machine instance 810B. The reuse of the memory without scrubbing can be based on the fact that the virtual machine instances are in the same memory usage trust group 847.

The trust group 847 indicates that the two instances trust each other, so it is not necessary to scrub memory that the instances reuse after each other's use.

The feature of reusing memory among trust groups can be called "memory usage group stickiness" because memory can tend to remain within a particular memory usage group (e.g., be reallocated to other instances in the same group).

Example 29

Figure 9:
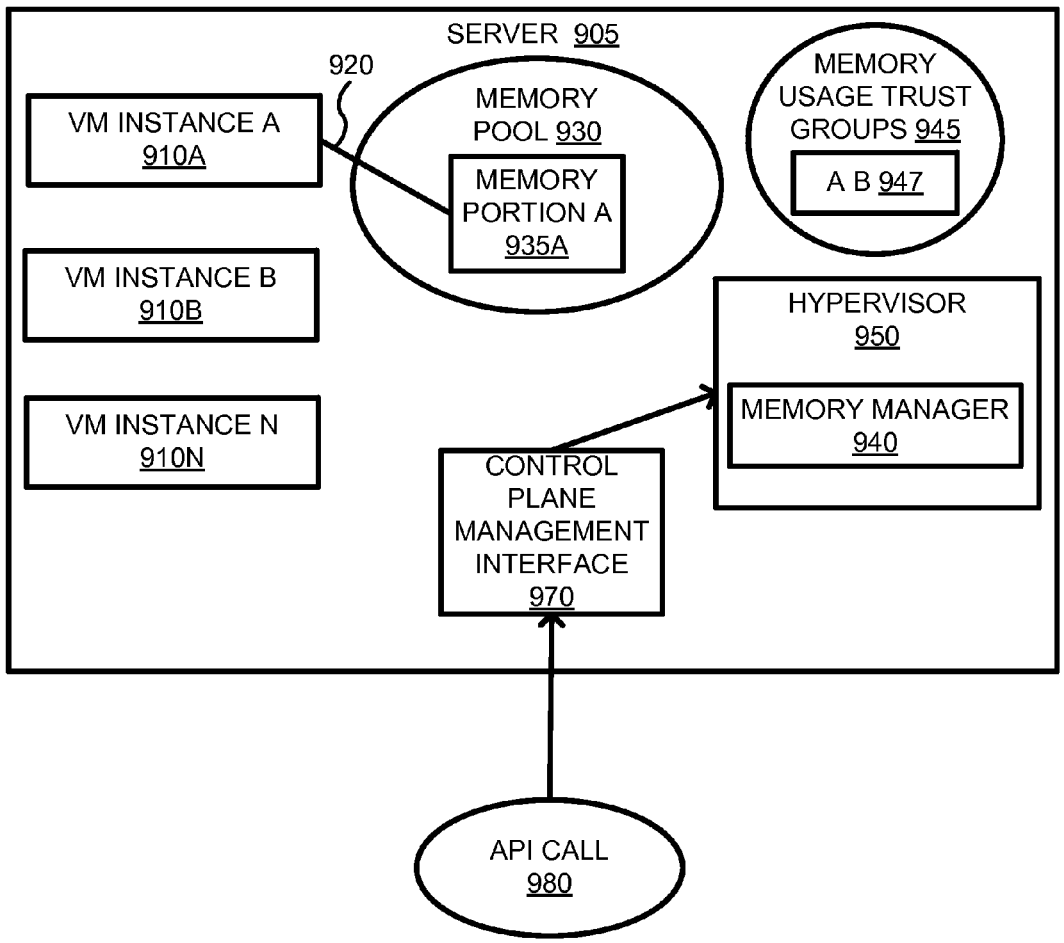
FIG. 9 is a block diagram of an example system implementing secure virtual machine memory allocation via memory usage trust groups.

Example System Implementing Secure Virtual Machine Memory Allocation Via Memory Usage Trust Groups FIG. 9 is a block diagram of an example system 900 implementing secure virtual machine memory allocation via memory usage trust groups. The server 905, virtual machine instances 910A-N, memory pool 930, memory portion 935A, memory manager 940, and memory trust groups 945 (e.g., 947) can perform as described for FIGS. 8A-C, above.

The memory manager 940 can be incorporated into a hypervisor 950 that accepts configuration directives from a control plane management interface 970 that receives API calls 980 as part of a web service provided to customers availing themselves of the virtual machine hosting environment. As described herein, the API calls 980 can be used to configure the behavior of the memory manager 940 (e.g., to enable memory usage trust groups as described herein).

Example 30

Figure 10:
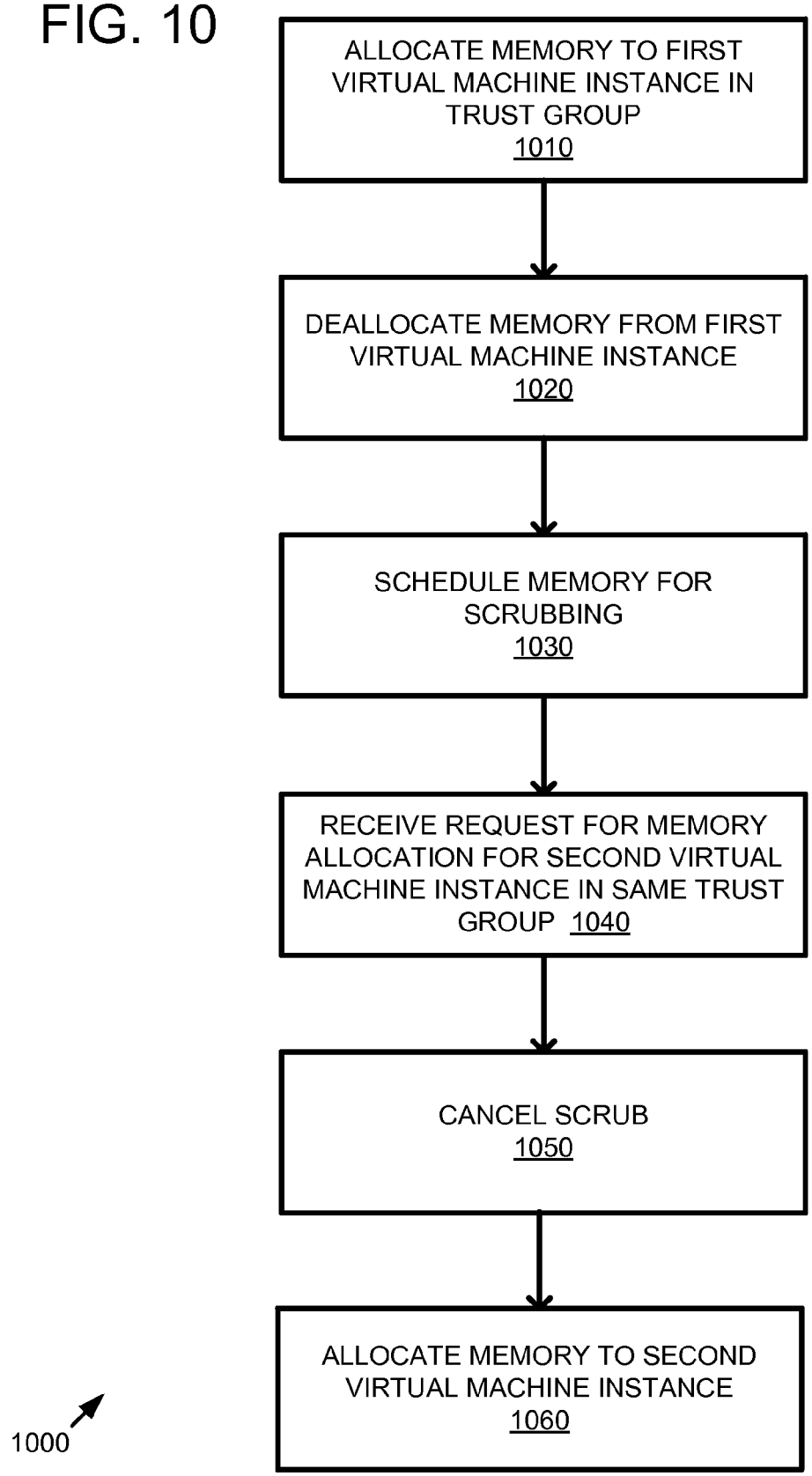
FIG. 10 is a flowchart of an example method of secure virtual machine memory allocation via memory usage trust groups.

Example Method of Secure Virtual Machine Memory Allocation via Usage Trust Groups FIG. 10 is a flowchart of an example method 1000 implementing secure virtual machine memory allocation via memory usage trust groups and can be implemented, for example, in a system such as that shown in FIG. 8 or 9. In the example, two different virtual machine instances are in the same memory usage trust group.

At 1010, memory is allocated to a first virtual machine instance that is associated with a memory usage trust group.

At 1020, memory is deallocated from the first virtual machine instance.

At 1030, the memory is scheduled for scrubbing.

At 1040, a memory request for a second virtual machine instance in the same memory usage trust group as the first virtual machine instance is received.

At 1050, responsive to determining that the available (e.g., deallocated) memory was deallocated from a virtual machine instance in the same memory usage trust group as the requesting instance, scrubbing of the deallocated memory is canceled. Canceling can occur after the deallocated memory is partially scrubbed.

At 1060, the memory is allocated to the second virtual machine instance.

Example 31

Figure 11:
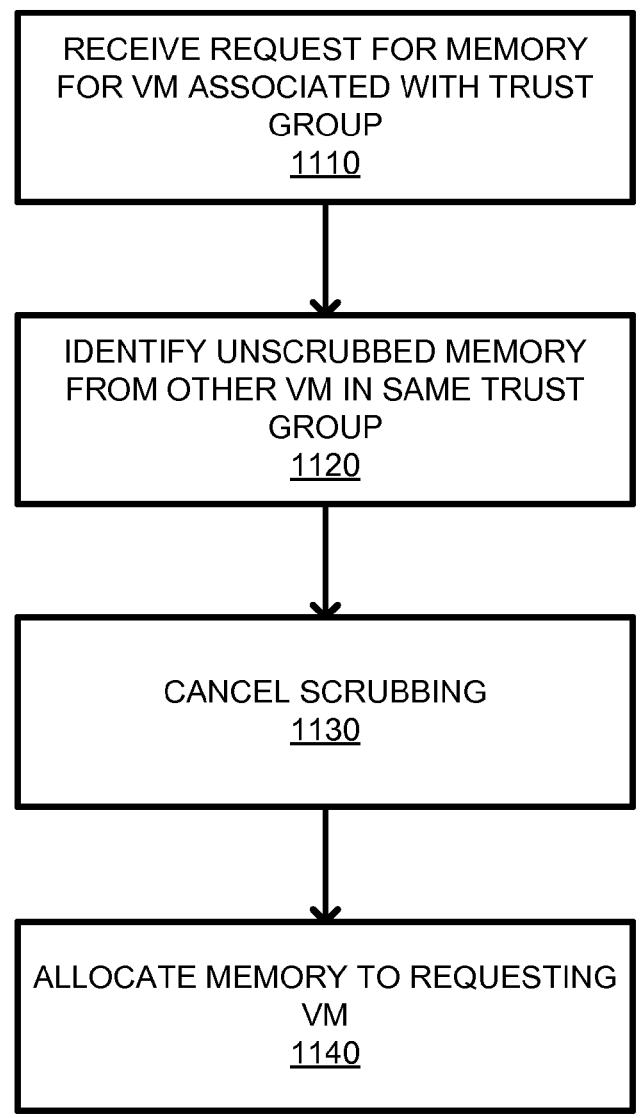
FIG. 11 is a flowchart of an example alternative method of secure virtual machine memory allocation via memory usage trust groups.

Example Alternative Method of Secure Virtual Machine Memory Allocation via Memory Usage Trust Groups FIG. 11 is a flowchart of an example alternative method 1100 implementing secure virtual machine memory allocation via memory usage trust groups and can be implemented, for example, in a system such as that shown in FIG. 8 or 9. In the example, two different virtual machine instances are in the same memory usage trust group.

At 1110, a request for memory for a virtual machine associated with a memory usage trust group is received.

At 1120, unallocated memory that is at least partially unscrubbed after deallocation from another virtual machine instance (associated with the same memory usage trust group) is identified.

At 1130, responsive to identifying the unallocated memory, scrubbing of the unallocated memory is canceled.

At 1140, the memory is allocated to the requesting virtual machine instance.

Example 32

Example Extension of Memory Usage Trust Groups to Reboot Scenario

Reusing memory within memory usage trust groups can be extended to a reboot scenario. For example, when memory is deallocated during reboot of a virtual machine instance, if a memory allocation request is received from an instance in the same trust group, the memory can be allocated to the requesting instance.

Example 33

Example Memory Usage Trust Groups

In any of the examples herein, a plurality of virtual machine instances can be designated as belonging to a same memory usage trust group. In practice, the memory usage trust group can be subsumed by a larger designation, such as a security partition, a generic trust group, or the like.

Although a customer identifier can be used as a trust group, customers may wish to have finer grained control over trust groups (e.g., for processing performed on behalf of different internal users who do not share a trust relationship).

Example 34

Example Memory Allocation Policy

Figure 12:
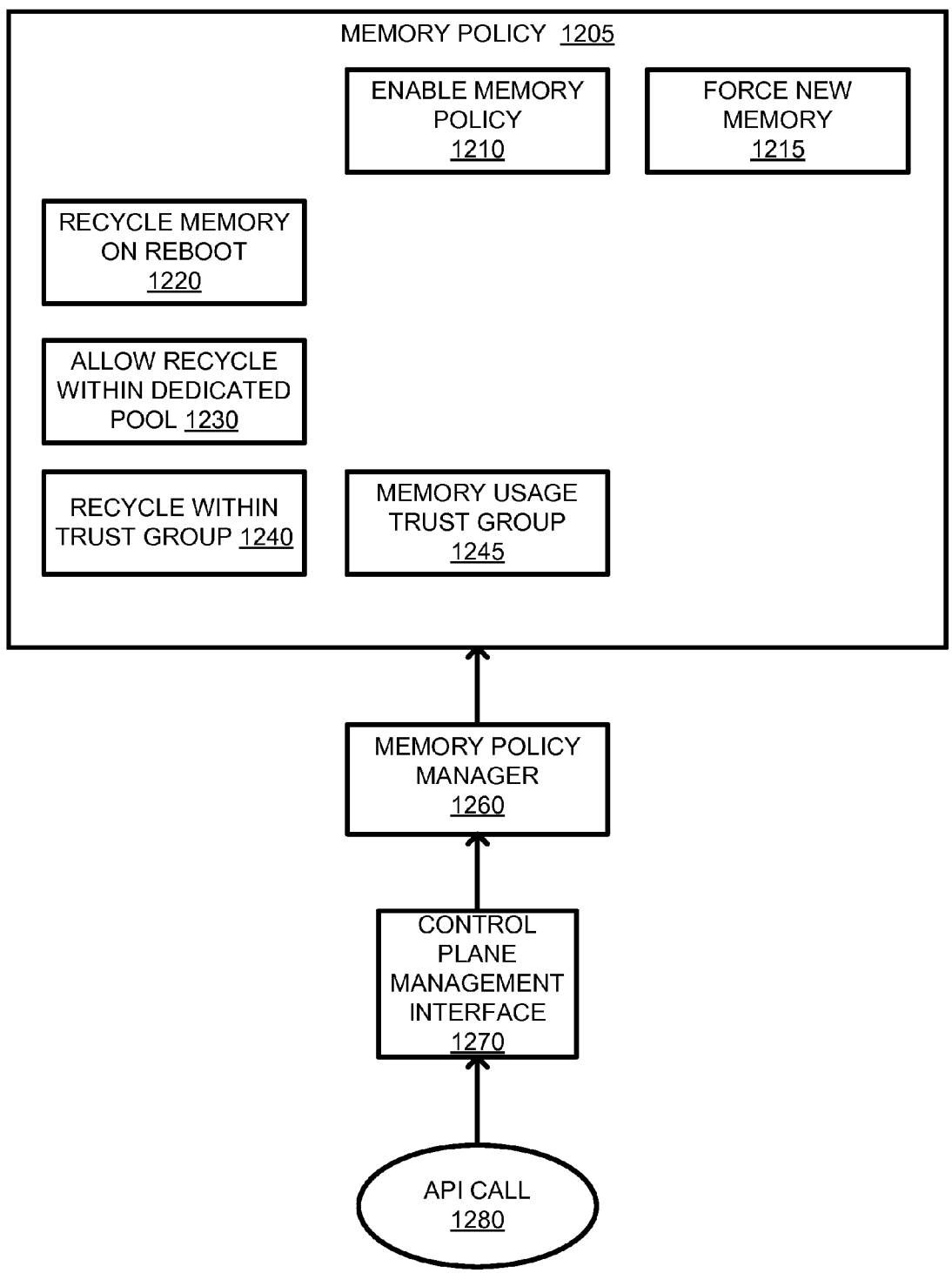
FIG. 12 is a block diagram of an example memory allocation policy.

To facilitate management and configuration of the features described herein, a memory allocation policy can be implemented. FIG. 12 is a block diagram of an example memory allocation policy 1205.

Such a policy can be implemented as a data structure, XML, or other mechanism that can be stored, configured, and duplicated. The policy can be associated with individual instances, customers, users, trust groups, or the like. Such association can cause the policy to be applied to covered virtual machine instances (e.g., the explicitly specified instance or instances associated with a customer, user, trust group, or the like).

Although other implementations are possible, many of the values (e.g., enable memory policy value 1210, force new memory value 1215, recycle memory on reboot value 1220, allow recycle within dedicated pool value 1230, and recycle within trust group value 1240) can take the form of Boolean values (e.g., yes/no, 0/1, or the like).

In the example, an enable memory policy value 1210 indicates whether or not any memory re-use (e.g., without scrubbing) is to be implemented. For whatever reason, it may be desired not to use the memory re-use features described herein. If so, the policy can be disabled via the value 1210 (e.g., by setting the value to false or the like).

Another value 1215 for forcing new memory can be implemented to support forcing memory allocations to different memory, rather than re-using (e.g., whether or not the memory is scrubbed).

A value 1220 can indicate whether memory is to be recycled on reboot without scrubbing as described herein.

A value 1230 can indicate whether memory is to be recycled within a dedicated pool without scrubbing as described herein.

A value 1240 can indicate whether memory is to be recycled within a trust group as described herein. A memory usage trust group identifier 1245 can be specified to indicate in which trust group a virtual machine instance belongs. Such a trust group identifier can be ensured to be unique across customers (e.g., instances from two different customers cannot be accidentally or intentionally placed in the same trust group). Other arrangements are possible. For example, the trust group identifier 1245 can be set to a special value (e.g., nil, 0, or the like) to specify that recycling within trust groups is not permitted.

API calls 1280 to a control plane management interface 1270 can direct a memory policy manager 1260 to alter the memory policy 1205 for a particular virtual machine instance, customer, user, trust group, or the like as described herein.

Example 35

Example Inhibition of Scrubbing

In any of the examples herein, inhibition of or avoiding scrubbing can comprise canceling memory scrubbing if scheduled or already begun.

Example 36

Example API Calls

In any of the examples herein, API calls can be used to control the implementation of the various memory recycling technologies described herein. For example, an API call can specify a virtual machine instance, trust group, customer, user, or the like and indicate which features are to be implemented and how. A memory policy as described herein can be created, manipulated, and applied via such API calls.

Such API calls can be received by a server from a control component that is operated by the environment provider or a customer of the environment.

An API call can support per-virtual machine instance configuration. For example, the API call can comprise a parameter specifying the virtual machine instance. Features such as memory reuse without scrubbing after reboot and the like can thus be controlled via the API calls. Example options are shown in Table 1.

TABLE 1

Example API Call Options

| Option Name | Functionality |
|---|---|
| Enable memory recycling | Allows memory recycling options to be used |
| Enable memory recycling after reboot | Turns on memory recycling after reboot |
| Enable memory recycling via dedicated pool | Turns on memory recycling within a dedicated pool |
| Enable memory recycling within trust group | Turns on memory recycling within a trust group |
| Specify trust group | Specifies a memory usage trust group within which memory can be recycled |
| Specify memory recycling policy | Specifies a memory recycling policy that can indicate one or more of the above options. |
| Merge dedicated memory sub-pools | Merges two or more dedicated memory pools into one |
| Partition dedicated memory sub-pool | Partitions a dedicated memory pool into two or more resulting pools |

The API call options can be specified in a separate data structure (e.g., policy) that is referenced in the API call, or the parameters can be specified in the API call itself.

In some cases, a series of API calls can be used to set up configuration before the virtual machine is instantiated. Such API calls can set up configuration so that a virtual machine instance has the specified configuration at instantiation time. Alternatively, some options can be specified after the instance has been instantiated.

Example 37

Example Security Template

In any of the examples herein, rather than repeatedly specifying parameters, a security template can be created, named, and reused for subsequent configurations. For example, a particular customer may wish to specify a certain set of features in a security policy for a set of virtual machine instances. The template can be applied (e.g., via API calls) to such instances.

Example 38

Example Hosting Environment

Figure 13:
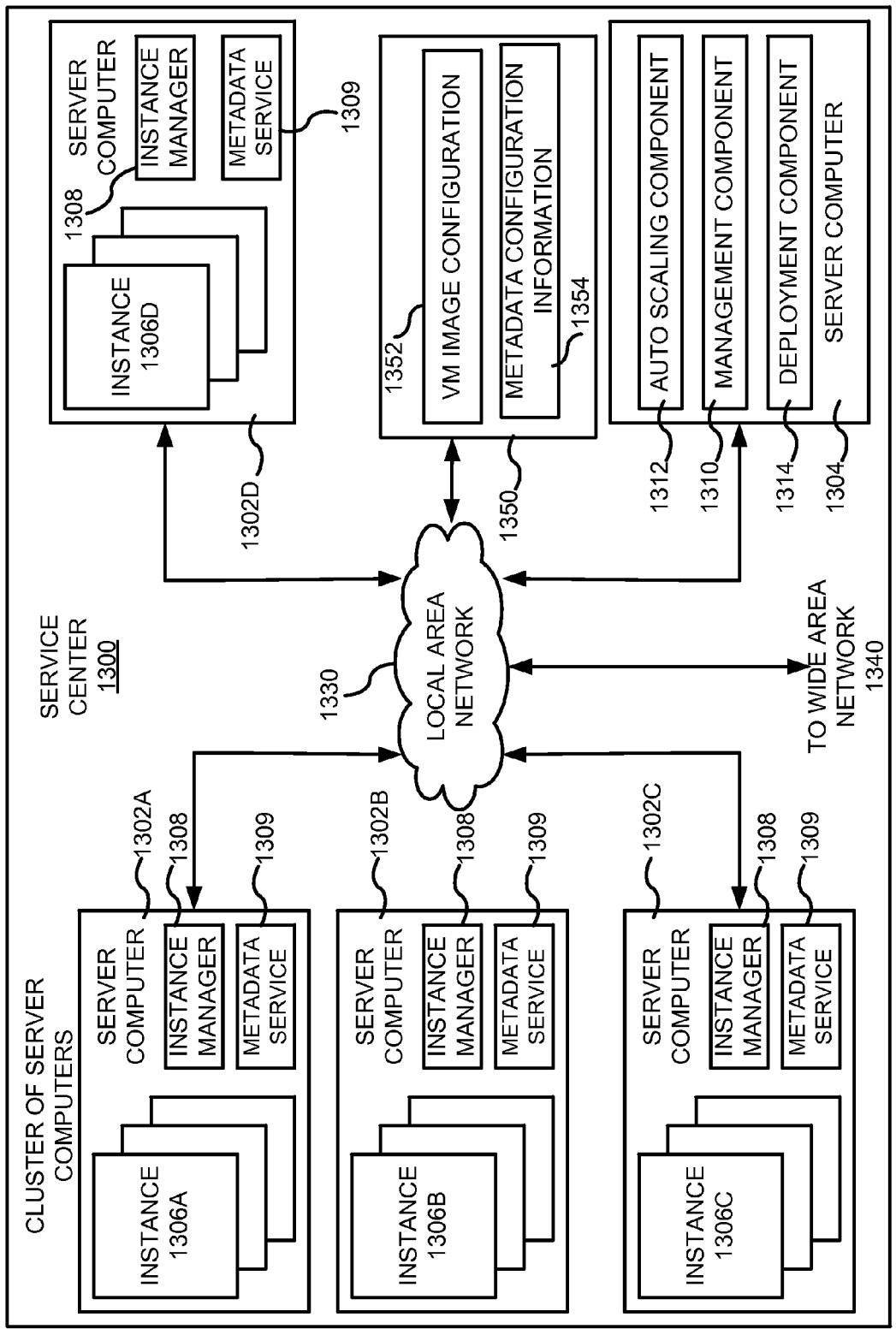
FIG. 13 is an example virtual machine hosting environment.

FIG. 13 is a computing system diagram of a network-based service center 1300 that illustrates one environment in which memory recycling for virtual machine instances can be used in a virtual machine hosting environment.

By way of background, the service center 1300 (i.e., the cloud provider) is capable of delivery of computing and storage capacity as a service to a community of end recipients. Generally speaking, the service center 1300 can provide the following models: Infrastructure as a Service, Platform as a Service, and/or Software as a Service (SaaS). Other models can be provided.

For the IaaS model, the service center 1300 can offer computers as physical or virtual machines and other resources. The virtual machines can be run as guests by a hypervisor, as described herein. The PaaS model delivers a computing platform that can include an operating system, programming language execution environment, database, and web server. Application developers can develop and run their software solutions on the service center platform without the cost of buying and managing the underlying hardware and software.

The SaaS model allows installation and operation of application software in the service center.

In some embodiments, end users access the service center 1300 using networked client devices, such as desktop computers, laptops, tablets, smartphones, etc. running web browsers or other lightweight client applications. The service center 1300 can be described as a "cloud" environment.

The particular illustrated service center 1300 includes a plurality of server computers 1302A-1302D. While only four server computers are shown, any number can be used, and large centers can include thousands of server computers. The server computers can comprise memory, one or more processors, and other hardware typically associated with a computing system. The server computers 1302A-1302D can provide computing resources for executing software instances 1306A-1306D. In one embodiment, the instances 1306A-1306D are virtual machines.

A virtual machine is an instance of a software implementation of a machine (i.e. a computer) that executes applications like a physical machine. In the example of virtual machines, the servers 1302A-1302D can be configured to execute an instance manager 1308 capable of executing the instances. The instance manager 1308 can be a hypervisor or another type of program configured to enable the execution of multiple instances 1306A-D on a single server. Additionally, any single one of the instances 1306A-D can be configured to execute one or more applications.

Although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

A server computer 1304 can be reserved for executing software components for managing the operation of the server computers 1302A-D and the instances 1306A-D. For example, the server computer 1304 can execute a management component 1310. A customer can access the management component 1310 to configure various aspects of the operation of the instances 1306A-D purchased by the customer. For example, the customer can purchase, rent or lease instances and make changes to the configuration of the instances. The customer can also specify settings regarding how the purchased instances are to be scaled in response to demand. An auto scaling component 1312 can scale the instances 1306 based upon rules defined by the customer. In one embodiment, the auto scaling component 1312 allows a customer to specify scale-up rules for use in determining when new instances should be instantiated and scale-down rules for use in determining when existing instances should be terminated. The auto scaling component 1312 can comprise a number of subcomponents executing on different server computers 1302A-D or other computing devices. The auto scaling component 1312 can monitor available computing resources over an internal management network and modify resources available based on need.

A deployment component 1314 can be used to assist customers in the deployment of new instances 1306 of computing resources. The deployment component can have access to account information associated with the instances, such as who is the owner of the account, credit card information, country of the owner, etc. The deployment component 1314 can receive a configuration from a customer that includes data describing how new instances 1306 should be configured. For example, the configuration can specify one or more applications to be installed in new instances 1306, provide scripts and/or other types of code to be executed for configuring new instances 1306, provide cache logic specifying how an application cache should be prepared, and other types of information. The deployment component 1314 can utilize the customer-provided configuration and cache logic to configure, prime, and launch new instances 1306. The configuration, cache logic, and other information may be specified by a customer using the management component 1310 or by providing this information directly to the deployment component 1314.

The deployment component 1314 can receive an API call for launching a new instance 1306 and use an identifier associated therewith to determine a VM registration record 1350, which can be stored in a database, on a server computer, etc. The VM registration record 1350 can include a VM image configuration 1352 and metadata configuration information 1354. The deployment component can then use the VM registration record 1350 to launch a VM.

A network 1330 can be utilized to interconnect the server computers 1302A-1302D and the server computer 1304, 1350. The network 1330 can be a local area network (LAN) and can be connected to a Wide Area Network (WAN) 1340 so that end users can access the service center 1300. The network topology illustrated in FIG. 13 has been simplified; any other type of network arrangement or networking devices can be utilized to interconnect the various computing systems disclosed herein.

Example 39

Example Computer Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer. As should be readily understood, the term computer-readable storage media does not include communication connections, such as modulated data signals.

The computing systems described herein can take the form of any of a variety of general purpose or dedicated computer-based hardware that includes memory, multi-processor systems, multi-computer systems, and the like.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, or any other suitable programming language. Likewise, the disclosed technology is not limited to any particular computer or type of hardware.

Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an Intranet, software applications, cable (including fiber optic cable), magnetic communications, electromagnetic communications (including RF, microwave, and infrared communications), electronic communications, or other such communication means.

Example 40

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the items (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Alternatives

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. One or more non-transitory computer-readable storage media comprising computer-executable instructions causing a computing system to perform a method comprising:
   managing a memory pool for allocation to virtual machine instances executing in a multi-customer hosting environment;
   assigning dedicated memory pools out of the memory pool for respective virtual machine instances executing in a multi-customer hosting environment;
   storing associations between the dedicated memory pools and respective of the virtual machine instances;
   within the memory pool, maintaining a memory pool for cross-virtual-machine-instance use;
   during deallocation of memory for a virtual machine instance, reclaiming the memory to the dedicated memory pool for the virtual machine instance;
   responsive to a ballooning memory allocation request from the virtual machine instance after the virtual machine instance is created, reallocating the memory that was deallocated and reclaimed to the dedicated memory pool to the virtual machine instance without scrubbing, wherein the memory that was deallocated is recycled within the dedicated memory pool and provided back to the virtual machine instance without scrubbing ordinarily performed before memory allocation; and
   before allocating memory reclaimed to the memory pool for cross-virtual-machine-instance use, scrubbing the memory reclaimed to the memory pool for cross-virtual-machine-instance use.

2. The one or more non-transitory computer-readable storage media of claim 1, wherein the method further comprises:
   scrubbing a given dedicated memory pool after termination of a respective virtual machine instance associated with the given dedicated memory pool.

3. The one or more non-transitory computer-readable storage media of claim 1, wherein the method further comprises:
   after reboot of the virtual machine instance, increasing a size of the dedicated memory pool for the virtual machine instance to a size of the virtual machine instance immediately before reboot.

4. A method comprising:
   managing a memory pool for allocation to virtual machine instances;
   assigning dedicated memory pools for respective of the virtual machine instances, wherein the assigning comprises assigning sub-pools within the memory pool to the respective virtual machine instances;
   storing associations between the dedicated memory pools and respective of the virtual machine instances;
   maintaining a memory pool for cross-virtual-machine-instance use;
   reallocating memory to a given virtual machine instance after reclamation to a dedicated memory pool for the given virtual machine instance without scrubbing, wherein the reallocating recycles memory within the dedicated memory pool and inhibits scrubbing ordinarily performed before allocating memory; and
   before reallocating memory reclaimed to the memory pool for cross-virtual-machine-instance use, scrubbing the memory reclaimed to the memory pool for cross-virtual-machine-instance use.

5. The method of claim 4 further comprising:

for a virtual machine instance having a dedicated memory pool, upon termination of a virtual machine instance, scrubbing the dedicated memory pool.

6. The method of claim 4 wherein:

the dedicated memory pools are isolated from each other.

7. The method of claim 4 further comprising:

after reboot of the given virtual machine instance, increasing a size of the dedicated memory pool for the given virtual machine instance to size of the given virtual machine instance immediately before reboot.

8. The method of claim 4 further comprising:

for a virtual machine instance having a dedicated memory pool, receiving a request to partition the dedicated memory pool; and responsive to the request, partitioning the dedicated memory pool into at least two partitions, wherein one of the partitions remains dedicated to the virtual machine instance.

9. The method of claim 8 further comprising:

receiving an API call indicating that a dedicated memory pool is to be partitioned; and responsive to receiving the API call, performing the partitioning.

10. The method of claim 4 further comprising:

for a virtual machine instance having a dedicated memory pool, receiving a request to merge the dedicated memory pool with another dedicated memory pool; and responsive to the request, merging the dedicated memory pool and the other dedicated memory pool.

11. The method of claim 10 further comprising:

receiving an API call indicating that dedicated memory pools are to be merged; and responsive to receiving the API call, performing the merging.

12. A system comprising:

a memory pool;

a plurality of virtual machine instances; and a memory manager configured to allocate a plurality of memory sub-pools within the memory pool for respective of the virtual machine instances and track associations between the virtual machine instances and respective of the memory sub-pools;

wherein the memory manager is further configured to scrub memory before allocating it to the virtual machine instances;

wherein the memory manager is further configured to inhibit memory scrubbing when allocating memory from a memory sub-pool associated with a given virtual machine instance to the given virtual machine instance, thereby recycling memory within the memory sub-pool for the given virtual machine instance; and wherein the memory manager is further configured to maintain a memory cross pool allocable to any of the virtual machine instances; and the memory manager is further configured to scrub memory returned to the memory cross pool.

13. The system of claim 12 wherein:

the memory manager is further configured to scrub a given memory sub-pool after termination of a respective virtual machine instance associated with the given memory sub-pool.

14. The system of claim 12 further comprising:

a hypervisor managing the virtual machine instances;

wherein the hypervisor comprises the memory manager.

15. The system of claim 12 further comprising:

a plurality of stored relationships between the virtual machine instances and respective of the memory sub-pools.

16. The system of claim 12 further comprising:

a control plane management interface configured to accept an API call that enables sub-pool creation for a virtual machine instance.

17. The system of claim 16 wherein:

the API call comprises a parameter for specifying the virtual machine instance.

18. The system of claim 12 further comprising:

a control plane management interface configured to accept an API call that indicates that at least two memory sub-pools are to be merged.

19. The system of claim 12 further comprising:

a control plane management interface configured to accept an API call that indicates that a memory sub-pool is to be partitioned.

20. The system of claim 12 wherein:

the memory pool is shared among virtual machine instances executing for different customers.

\* \* \* \* \*